United States Patent [19]

Takamatsu

[11] 4,383,789
[45] May 17, 1983

[54] ARTICLE AUTOMATIC STORAGE AND RETRIEVAL APPARATUS

[75] Inventor: Shunicti Takamatsu, Osaka, Japan

[73] Assignee: Itoki Kosakusho Co. Ltd., Osaka, Japan

[21] Appl. No.: 267,511

[22] Filed: Apr. 9, 1981

Related U.S. Application Data

[63] Continuation of Ser. No. 889,522, Mar. 23, 1978, abandoned.

[30] Foreign Application Priority Data

Mar. 26, 1977 [JP] Japan .................................. 52/32794
Jun. 9, 1977 [JP] Japan .................................. 52/67342
Jun. 9, 1977 [JP] Japan .................................. 52/67343

[51] Int. Cl.³ .............................................. B65G 65/00
[52] U.S. Cl. ..................................... 414/277; 414/267;
414/274; 414/279; 414/621; 414/741; 414/911;
294/88; 294/111; 294/112
[58] Field of Search ........................ 294/88, 111–112;
414/266–286, 618–622, 627, 741, 911

[56] References Cited

U.S. PATENT DOCUMENTS

| 2,451,368 | 10/1948 | White et al. | 414/282 |
|---|---|---|---|
| 2,520,564 | 8/1950 | Reagle | 414/622 |
| 2,573,667 | 10/1951 | Le Tourneau | 294/107 |
| 2,632,574 | 3/1953 | Goertz | 294/111 |
| 2,677,475 | 5/1954 | Davies et al. | 414/918 |
| 2,916,171 | 12/1959 | Schwartz | 414/621 |
| 3,021,167 | 2/1962 | Ostdiek | 294/112 |
| 3,126,223 | 3/1964 | Kughler | 414/622 |
| 3,272,364 | 9/1966 | Mindrum et al. | 414/622 |
| 3,289,485 | 12/1966 | Cazalis et al. | 414/627 |
| 3,297,379 | 1/1967 | Artaud et al. | 414/273 |
| 3,473,675 | 10/1969 | Goldammer et al. | 414/273 |
| 3,504,808 | 4/1970 | Carabates | 414/283 |
| 3,750,804 | 8/1973 | Lemelson | 414/280 |
| 3,854,604 | 12/1974 | Peterson et al. | 414/277 |
| 3,920,195 | 11/1975 | Sills et al. | 414/273 |

FOREIGN PATENT DOCUMENTS

| 815371 | 6/1969 | Canada | 414/279 |
|---|---|---|---|
| 903555 | 2/1954 | Fed. Rep. of Germany | 414/621 |

Primary Examiner—Trygve M. Blix
Assistant Examiner—R. B. Johnson
Attorney, Agent, or Firm—Lieberman, Rudolph & Nowak

[57] ABSTRACT

A commodity retrieval and storage apparatus which includes shelves for storing a plurality of like configured commodities. A movable carriage is vertically and horizontally displaceable along the shelves and carries apparatus for engagement with the commodity selected, apparatus for transferring the selected commodity to the carriage and apparatus for securely holding the selected commodity to the carriage. After transfer of the commodity to the carriage, the carriage may be moved to a commodity processing area.

5 Claims, 11 Drawing Figures

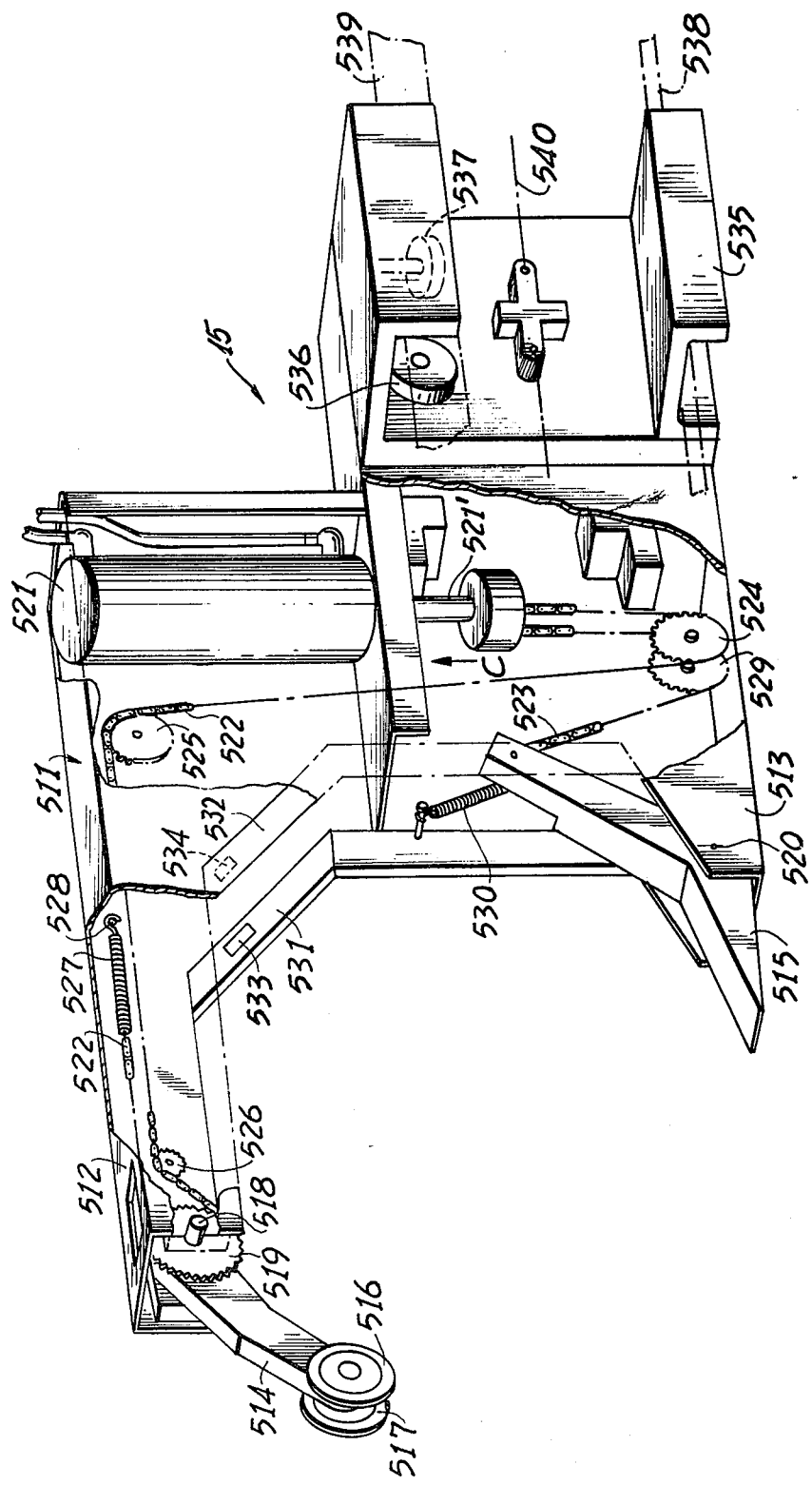

ARTICLE AUTOMATIC STORAGE AND RETRIEVAL APPARATUS

CROSS REFERENCE TO RELATED APPLICATION

This application is a continuation of Ser. No. 05/889,522 filed on Mar. 23, 1978 now abandoned.

BACKGROUND OF THE INVENTION

This invention relates generally to a commodity retrieval and storage apparatus used to store and selectively retrieve a plurality of like configured commodities. While a variety of such apparatus is known in the art, many of these devices suffer from numerous disadvantages. These devices may not permit sufficiently high density storage for the most economical use of storage space. Such devices may also inadequately protect the commodity during the retrieval or transfer operations and may require a constant input of electrical power in order to hold the commodity at all times. During the retrieval operation, such devices may require large inputs of power in order to overcome the friction during the removal of the commodity from the shelves. Finally, many such devices engage the commodity by its face rather than its periphery which results in an overly large spacing between adjacent stored commodities. The instant invention is directed to overcoming such difficulties.

SUMMARY OF THE INVENTION

Generally speaking, in accordance with the invention, a commodity retrieval and storage apparatus is provided. The apparatus includes shelves for holding a plurality of stored commodities and a carriage displaceable along and between the shelves. A retrieval apparatus displaceable on the carriage will engage and secure the commodity and will transfer same to the carriage for further movement of the commodity to a commodity processing apparatus.

Accordingly, it is an object of this invention to provide a storage and retrieval apparatus permitting high density storage of commodites.

Another object of this invention is to provide a commodity retrieval and storage apparatus which secures and holds the commodity during transfer thereof to prevent breakage.

Another object of this invention is to provide a commodity storage and retrieval apparatus that securely holds the commodity even if electricity is cut off during its operation.

Another object of this invention is to provide a commodity storage and retrieval apparatus that is energy efficient.

Yet another object of this invention is to provide a commodity storage and retrieval apparatus that is simple in operation and construction.

Still another object of this invention is to provide a commodity storage and retrieval apparatus which engages only the periphery of the stored commodity.

Still other objects of this invention will become apparent upon reading of the detailed specification to follow.

BRIEF DESCRIPTION OF THE DRAWINGS

For a better understanding of the invention, reference is made to the following drawings in which:

FIG. 6 is a cutaway perspective view of the commodity retrieval apparatus of the second preferred embodiment.

DESCRIPTION OF THE PREFERRED EMBODIMENTS

Figure 1:
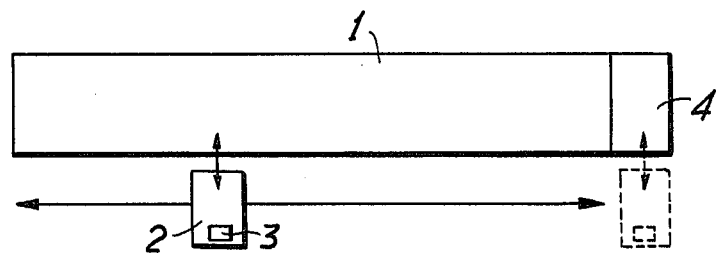
FIG. 1 is a diagrammatic view of the operation of the commodity storage and retrieval apparatus constructed in accordance with the instant invention.

FIG. 1 of the drawings illustrates diagrammatically the commodity storage and retrieval device of the instant invention. The device consists of a storage shelf 1, which holds a plurality of disc-shaped commodities, such as film or tape cans, in a vertical position. A movable carriage 2 is movable along the longitudinal extent of shelf 1, as well as vertically along stacked rows of shelves 1. Carriage 2 includes a commodity retrieval apparatus 3 which can engage and remove an individual commodity from shelf 1 and transfer it to carriage 2. Carriage 2 may then be used to transport the selected commodity to a commodity handling section 4 for further processing or delivery of the commodity. A suitable drive and support system for carriage 2 is shown in U.S. Pat. No. 3,840,131 (Castaldi), the disclosure of which is hereby incorporated by reference. The operation of commodity handling section 4, is also well known in the art, and no further discussion as to its operation is necessary in order to understand the present invention.

Figure 1A:
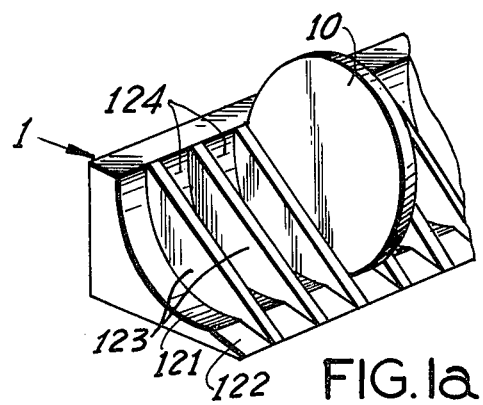
FIG. 1a is a perspective view of the shelf of the instant invention with the commodity stored therein.

FIG. 1a, illustrates shelf 1, holding a commodity 10. Shelf 1 includes a concave surface 121 which extends from the upper portion to its lower edge 122. The concavity of surface 121 corresponds to the circumference of commodity 10. Edge 122 is higher than the lowermost part of concave surface 121 so that commodity 10 will be retained therein. Upright dividing walls 123 will prevent commodity 10 from tipping over. Thus, a pocket 124 for each commodity 10 is formed by adjoining dividing walls 123 and concave surface 121.

Figure 2:
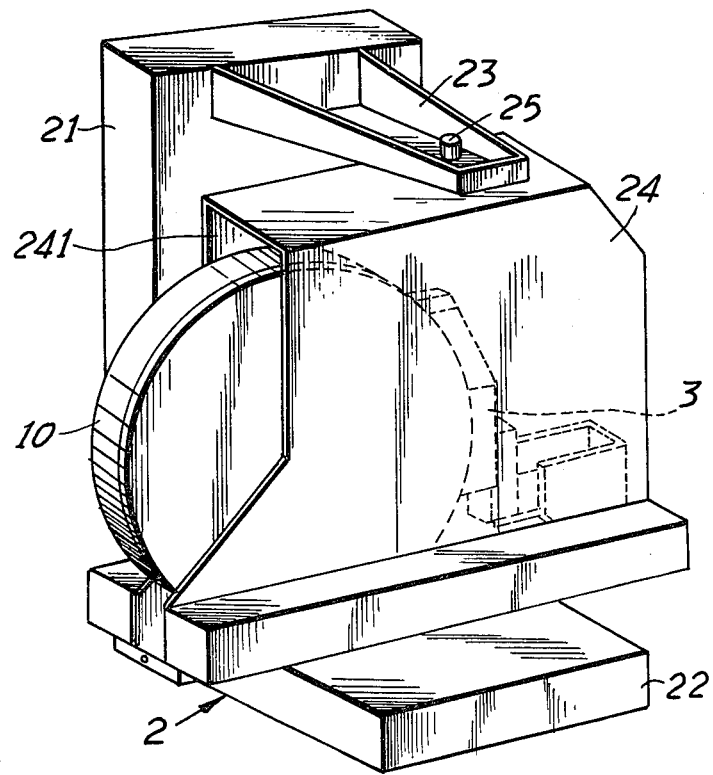
FIG. 2 is a perspective view of the carriage and frame with the retrieval apparatus shown by dashed lines.

FIG. 2 illustrates carriage 2 and commodity retrieval apparatus 3 in greater detail. Carriage 2 is generally L-shaped in configuration and may move both horizontally along the longitudinal axis of shelf 1, as well as vertically along stacked rows of shelves 1. Carriage 2 has a horizontal section 22 and a vertical section 21 from which an arm 23 extends in the direction of horizontal section 22. A frame 24, which mounts commodity retrieval apparatus 3 is mounted between arm 23 and horizontal section 22 by means of a pin 25, so that it may pivot about pin 25. Frame 24 includes an opening 241 which permits commodity 10 to be held within frame 24 during the travel of carriage 2.

In operation, carriage 2 will be positioned at the desired storage position along shelf 1. Retrieval apparatus 3 will then be displaced forwardly through opening 241 to engage the periphery of commodity 10. After engagement, a vacuum created by a vacuum head 32 will cause commodity 10 to be secured to retrieval apparatus 3 which will then be displaced rearwardly to move commodity 10 within frame 24. Carriage 2 may then be activated to move it to handling area 4, retrieval apparatus 3 will then be displaced forwardly to transfer commodity 10 to handling area 4 when the vacuum is released.

It is seen that during transfer, commodity 10 is protected from damage or disengagement by its location within frame 24. Furthermore, frame 24 is rotatable because of its pivotal mounting on pin 25. Commodity 10 may be displaced by retrieval apparatus 3 in any direction, which permits handling section 4 to be installed at any suitable location.

Figure 3:
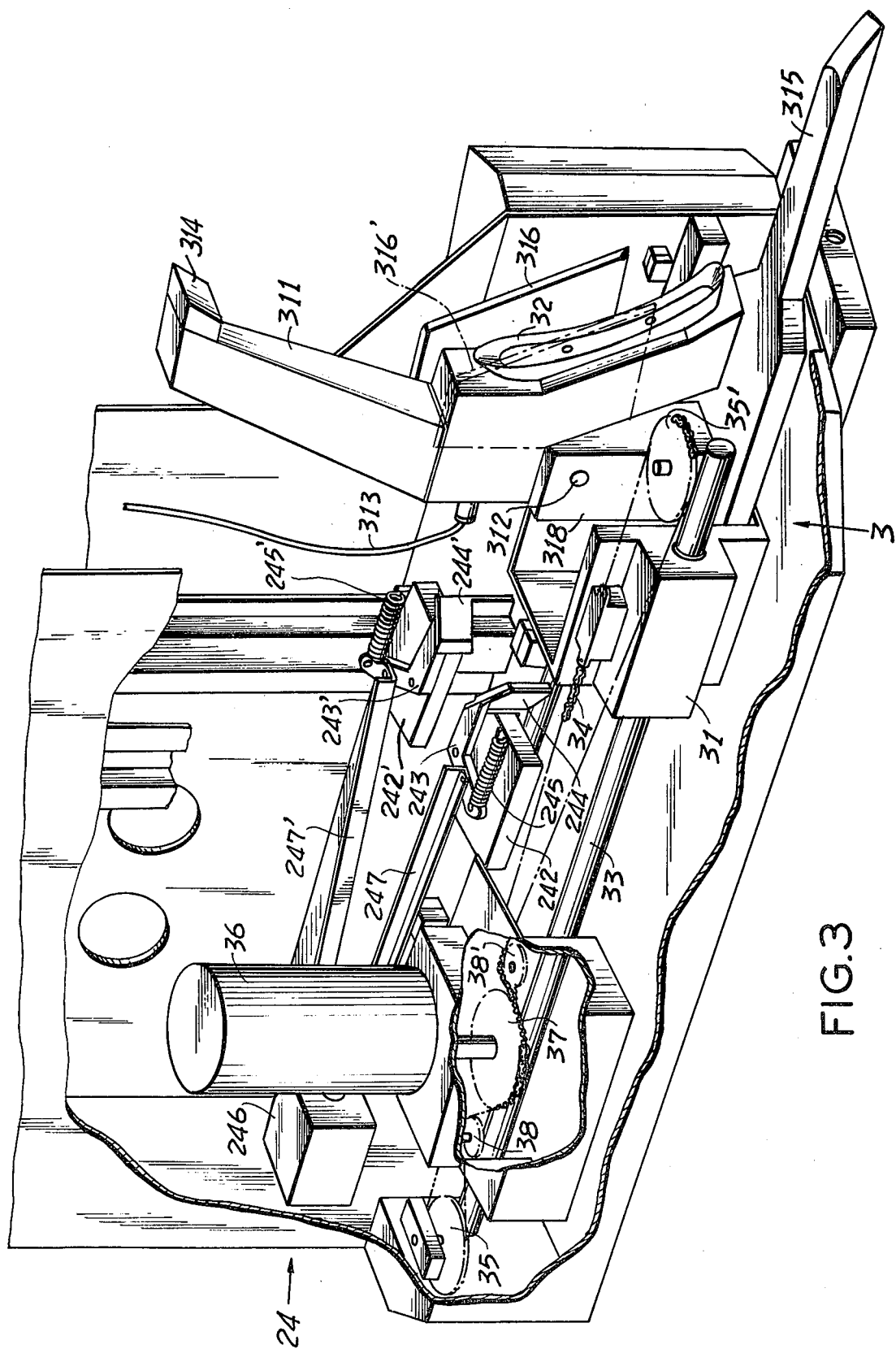
FIG. 3 is a cutaway perspective view of the commodity retrieval apparatus.

The construction of retrieval apparatus 3 will now be illustrated in greater detail as shown in FIG. 3. Retrieval apparatus 3 includes a member 31 slidably mounted on a pair of guide shafts 33, so that it may be slidably displaced within frame 24. Each end of guide shafts 33 is fixed to frame 24, the forward end of guide shafts 33 is not shown fixed to frame 24 since the drawing has been cut away to show the mechanism in greater detail. Member 31 is displaced by a chain 34 connected to it. Chain 34 runs between a pulley 35, mounted to the rearward portion of frame 24 and a pulley 35' mounted at the forward portion of frame 24. Chain 34 is driven through a gear 37 by a motor 36 mounted on frame 24. A pair of tension rollers 38, 38' are used to take up any slack in chain 34. Thus, when motor 36 is rotated, retrieval apparatus 3 will be displaced within and without frame 24.

Mounted to a slidable member 31 is a vertically extending member 318 which pivotally joins arm 311 to sliding block 31 by means of a pin 312, to permit arm 311 to rotate a small amount about pin 312. Mounted to the lower portion of arm 311 is vacuum absorbent head 32, and a vacuum line 313 is attached to the rear of arm 311 which, in turn, is internally routed to power vacuum head 32. The pump powering vacuum head 32 is attached to vacuum line 313 and is not shown in the drawings. Also mounted to member 31 and extending beyond arm 311 is a forward extending arm 315, having a tapered forward edge.

The purpose of arm 315 is to lift commodity 10 as member 31 is displaced forwardly, which reduces the power needed to remove commodity 10 from shelf 1. After being lifted by arm 315, commodity 10 will be engaged by vacuum head 32 and a support pad 314 mounted to the upper portion of arm 311. Pad 314 prevents commodity 10 from jumping up when engaged by arm 315 and vacuum head 32. In order to secure commodity 10 against lateral displacement, a pair of guide panels 316, 316' on each side of absorbent head 32 will contact the sides of commodity 10. After engagement with commodity 10, the actuation of motor 36 will cause retrieval apparatus 3 and attached commodity 10 to move rearwardly within frame 24.

Located within frame 24 is a clamping mechanism which will secure commodity 10 in place during movement of carriage 2. The clamping mechanism consists of a pair of levers 243, 243' pivotally mounted to frames 242, 242' which, in turn, are fixedly mounted to frame 24 on each side of the commodity storage space. Each arm 243, 243' has a pad 244, 244' on one end and a spring 245, 245' to bias pads 244, 244' into engagement with commodity 10. A pair of levers 247, 247' are pivotally joined to arms 243, 243' and extend rearwardly to a solenoid 246. Solenoid 246 controls the position of arms 247, 247' which, in turn, controls the position of levers 243, 243' and pads 244, 244'. When solenoid 246 is activated, levers 247, 247' will prevent the bias of springs 245, 245' from acting on levers 243, 243'. When this occurs, pads 244, 244' will be unable to engage commodity 10 to permit member 31 and retrieval apparatus 3 to be displaced.

Figure 4:
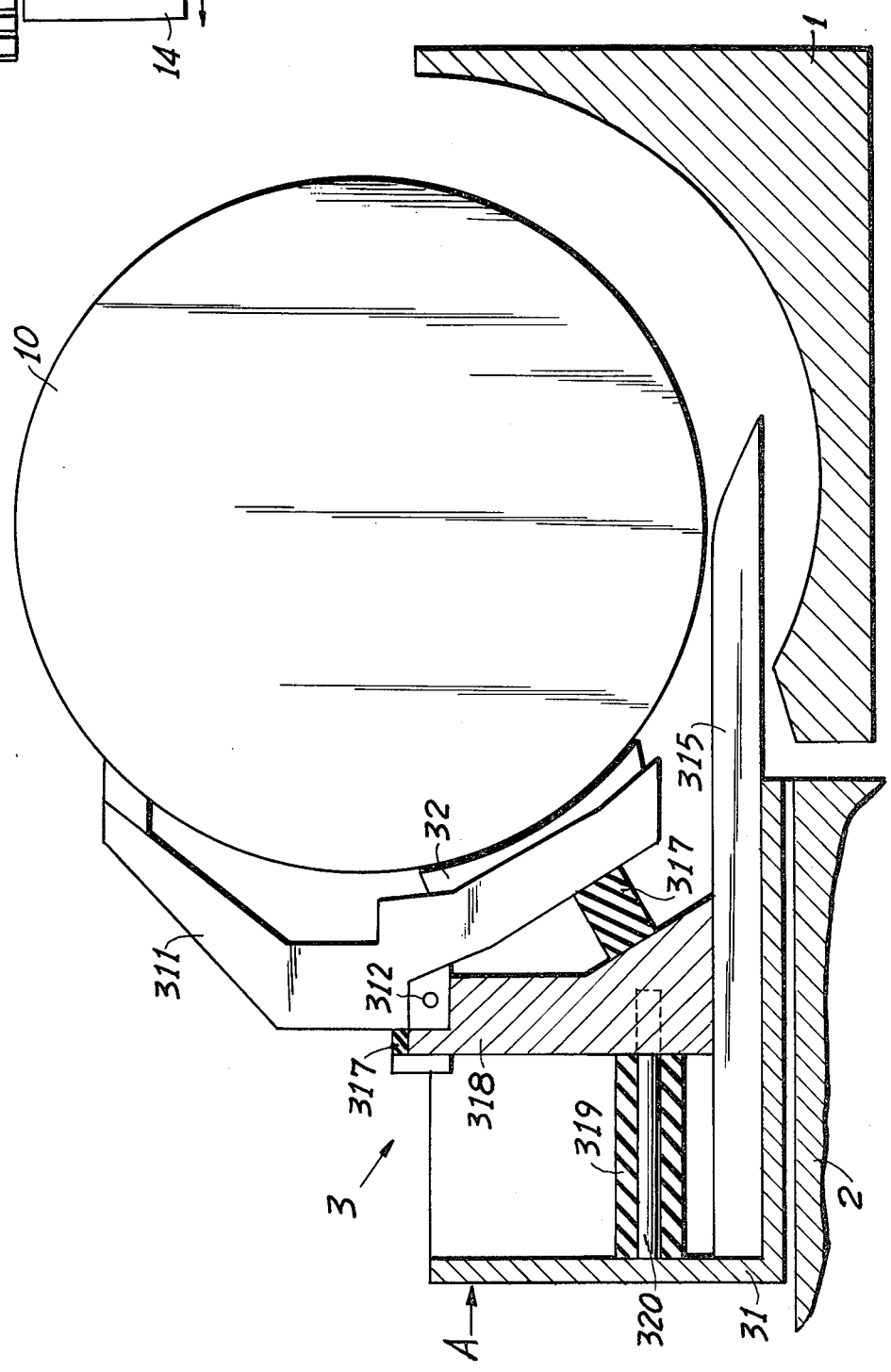
FIG. 4 is a sectional view of the commodity retrieval and storage apparatus showing the commodity being displaced away from the shelf.

FIG. 4 illustrates the retrieval of commodity 10 from storage shelf 1 by means of retrieval apparatus 3. When member 31 is moved in direction A by means of motor 36, the tapered end of rod 315 will engage and slide under the periphery of commodity 10. Commodity 10 will be lifted by the action of rod 315 and vacuum head 32 and pad 314 moved into contact with the periphery of commodity 10. The vacuum action of head 32 will cause commodity 10 to adhere to it and to engage pad 314, so that commodity 10 can be lifted and moved rearwardly away from shelf 1. The tapered end of rod 315 may be replaced by a roller mounted to the end of rod 315 to engage and lift commodity 10.

The pivotal movement of arm 311 about pin 312 is limited by a pair of resilient pads 317, 317'. Pads 317, 317' absorb the shock when head 32 engages commodity 10 and also compensate for any misalignment between arm 311 and commodity 10. To further absorb the shock of engagement between commodity 10 and retrieval apparatus 3, member 318 which mounts pin 312 is slidably mounted to a rod 320, which is fixedly mounted to member 31. An elastic pad 319 surrounds rod 320 and will cushion the shock of engagement since it permits member 318 to be displaced rearwardly a small distance upon engagement. The resiliency of pad 319 will then displace member 318 outwardly after the shock has been absorbed.

Figure 5:
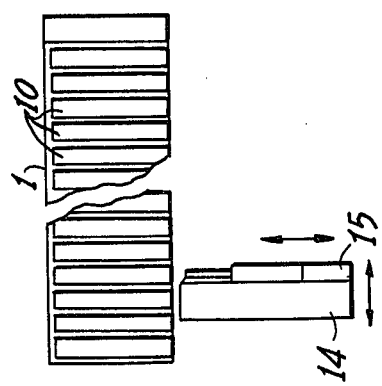
FIG. 5 is a diagrammatic view of a second preferred embodiment of the commodity retrieval and storage apparatus.

FIGS. 5 through 7 illustrate an alternative commodity retrieval apparatus 15, which may be used in place of retrieval apparatus 3. This apparatus is particularly suitable where commodity 10 is too heavy to be engaged by the use of a vacuum. As shown in FIG. 5, commodity 10 is again mounted edgewise along shelf 1 for retrieval utilizing a carriage 14 which may move along the length of the shelf and up and down among stacked shelves 1. Carriage 14 also includes a mechanism for moving retrieval apparatus 15 into position along shelf 1 to retrieve commodity 10.

FIG. 6 illustrates in detail the retrieval apparatus 15 which includes a frame 511, which includes an upper forward extending portion 512 and a lower forward extending portion 513. Upper portion 512 carries a pin 518 which pivotally mounts an arm 514. At the forward portion of arm 514 are a pair of freely rotatable rollers 517, 516. Pin 518 is fixedly joined to arm 514 and also mounts a sprocket wheel 519. Pivotally mounted to portion 513 of frame 511 by means of pin 520 is a lower arm 515 which tapers to a point near its forward section.

A solenoid 512 is mounted within frame 511 and has a movable plunger 521' to which a pair of chains 522, 523 are mounted. Chain 522 is first wrapped around a sprocket 524 mounted to portion 513 of frame 511 and, in turn, wraps around a sprocket 525 mounted to portion 512 of frame 511 and thereafter around a sprocket 526 located at the forward portion of section 512. Chain 522 is then wrapped around sprocket 519 which controls the movement of arm 514 and the end of chain 522 is joined to a spring 527 which is fixedly mounted to a pin 528 on frame 511. Chain 523 acts on arm 515 through sprocket 529 located at the lowermost part of frame 511. The end of chain 523 is attached to the rearward end of arm 515. Also attached to the rearward end of arm 515 is a spring 530 which biases the forward end of arm 515 downwardly.

When solenoid 521 is actuated, plunger 521' will be moved upwardly in direction C which, in turn, will cause chain 522 to pivot arm 514 downwardly and chain 523 to pivot arm 515 upwardly. When the power to solenoid 521 is released, springs 530 and 527 will return arms 515 and 514 respectively to their original positions.

When commodity 10 is received by retrieval apparatus 15, as will be more fully described hereafter, commodity 10 will rest between a pair of guide panels 532 and 531 which will prevent droppage of commodity 10 since its side walls will contact panels 532 and 531, should commodity 10 become tilted. A light source 533 is installed near the edge of panel 531 and a photoelectric cell 534 is installed near the edge of panel 532 in order to detect whether commodity has been received with the apparatus. Of course, the light source and the photoelectric cell can be mounted on any other section of retrieval apparatus 15, and any other method of commodity detection may also be used.

Retrieval apparatus 15 includes a channel 535 mounted to frame 511 which is in slidable engagement with a rod 538 which is mounted to carriage 14. A second rod, 539, also mounted to carriage 14 is engaged by rollers 536 and 537 carried by frame 511 to permit retrieval apparatus 15 to be displaced into and out of engagement with commodity 10. A chain 540 mounted to frame 511 is driven by a motor (not shown) on carriage 514 to displace retrieval apparatus 15 as a unit.

Figure 7A:
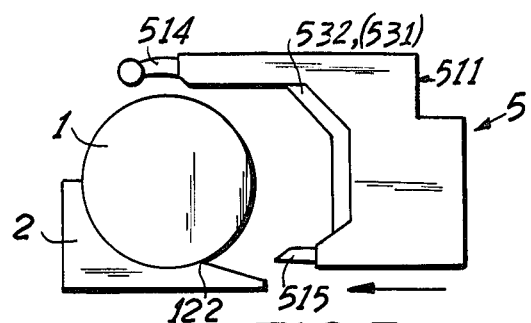
FIGS. 7a through 7d illustrate the operation of the retrieval apparatus of the second preferred embodiment.
Figure 7B:
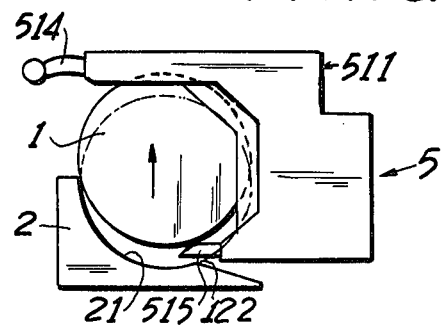
Figure 7C:
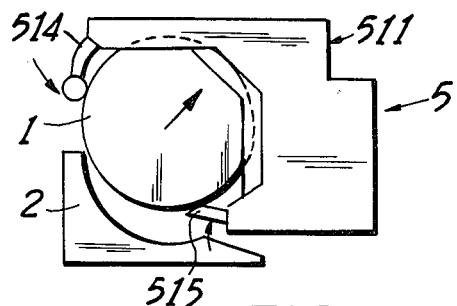
Figure 7D:
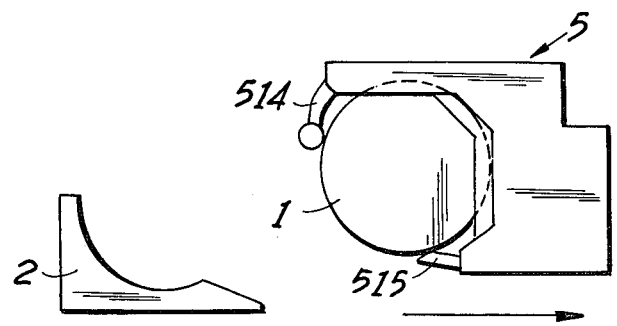

The operation of the steps of retrieval of commodity 10 is illustrated in FIGS. 7A through 7D. In FIG. 7A, retrieval apparatus is displaced towards shelf 1 by means of the carriage mounted motor and chain 540. As the forward edge of arm 515 approaches and engages the outer periphery of commodity 10, commodity 10 will be displaced upwardly as shown in FIG. 7B. At this time, the forward motion of retrieval apparatus 15 will been stopped, and the faces of commodity 10 will be located between guide panels 532 and 531. Solenoid 521 will be activated which will cause arm 515 to pivot upwardly and arm 514 to pivot downwardly, which will cause commodity 10 to be secured to retrieval apparatus 15, as shown in FIG. 7C. The carriage mounted motor will then displace retrieval apparatus 15 away from shelf 1 and the commodity may then be transported by means of carriage 2.

The storage operation is the opposite of the retrieval operation and consists of the operation in reverse sequence as that illustrated in FIG. 7. In the drawings, arm 515 has been shown as long enough to fit between commodity 10 and shelf 1. However, it may be made shorter so that it just engages the bottom of commodity 10. Furthermore, it is not necessary that the forward edge of arm 515 to be tapered, however, in such event the upper surface of lever 515 should engage the bottom of commodity 10. Finally, retrieval apparatus 15 can be arranged so that lever 515 is not movable at all, since the engagement of commodity 10 may be accomplished by the movement of lever 514 alone.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

The appended claims are intended to cover all the generic and specific features of the invention, and all statements of the scope of the invention which, as a matter of language, may be said to fall therebetween.

What is claimed is:

1. A commodity retrieval and storage apparatus comprising, shelf means for holding a plurality of said commodity, said commodity having a generally circular outer periphery and said shelf means having a concave depression therein with a lower support surface and an upstanding backwall to support said commodity, carriage means, displaceable along said shelf means, and including means for retrieving selected ones of said commodity from said shelf means, said retrieving means including, a forwardly extending upper arm, and a forwardly extending lower arm, said upper and lower arms being arranged to pivot from a first rest position to a second commodity engagement position, a movable member, a first flexible member extending from said upper arm to said movable member, a second flexible member extending from said lower arm to said movable member, said lower arm including an inclined plane portion at a forward end of said lower arm, means for moving said inclined plane portion of said lower arm under said commodity, whereby said commodity is moved in an upward direction along said upstanding backwall, means operative when said inclined plane portion has been moved under said commodity for displacing said movable member and said first and second flexible members, and for pivoting said upper arm and said lower arm from said first rest position to said second commodity engagement position, a first support member, wherein said upper arm is pivotally attached to said first support member, said commodity retrieval and storage apparatus further including a first sprocket wheel fixedly joined to said upper arm at said point of pivotal attachment, said first flexible member being attached to said first sprocket wheel and a plurality of additional sprocket wheels for carrying said first flexible member from said first sprocket wheel to said movable member, a second support member, wherein said lower arm is pivotally attached to said second support member, said second flexible member being attached to said lower arm and being carried to said movable member by one of said plurality of additional sprocket wheels.

2. A commodity retrieval and storage apparatus in accordance with claim 1, further including a spring member and wherein said upper and lower arms are maintained in said reset position by said spring member.

3. A commodity retrieval and storage apparatus in accordance with claim 2, wherein said upper arm includes roller means for engagement with the periphery of said commodity.

4. A commodity retrieval and storage apparatus in accordance with claim 1, wherein said carriage means includes means for holding said commodity in place after said commodity has been retrieved from said shelf means by said retrieving means.

5. A commodity retrieval and storage apparatus in accordance with claim 4, further including means for detecting receipt of said commodity within said holding means.

* * * * *